United States Patent [19]

Paszkiewicz et al.

[11] Patent Number: 5,407,377
[45] Date of Patent: Apr. 18, 1995

[54] MINIATURE TOY FOOTBALL HELMET AND METHOD OF MAKING

[76] Inventors: Daniel P. Paszkiewicz, 4906 Horse Hill Rd., Baldwin, Md. 21013; Thomas A. Paszkiewicz, 44 Neptune Dr., Joppa, Md. 21085

[21] Appl. No.: 890,125

[22] Filed: May 29, 1992

[51] Int. Cl.6 .................................. A63H 33/00
[52] U.S. Cl. .............................. 446/487; 496/100
[58] Field of Search ............ 273/236, 247, 288, 94, 273/DIG. 17; 446/487, 491, 3, 27, 100, 391, 474

[56] References Cited

U.S. PATENT DOCUMENTS 3,379,441  4/1965  Feather et al. .................. 273/94 R
3,527,461  9/1970  Prater ..................... 273/DIG. 17 X
4,550,911 11/1985  Daley ................................. 273/94
5,098,327  3/1992  Ferrero ........................ 446/487 X

OTHER PUBLICATIONS

"Super Jock" Super Toe Football Game, Publication in 273/94, Dated Mar. 10, 1978.

Primary Examiner—Sam Rimell
Attorney, Agent, or Firm—Aquilino & Welsh

[57] ABSTRACT

A miniature toy football helmet and a method of forming the helmet integrally with a face guard. The helmet including a pair of shells molded side by side with a face guard molded therebetween.

7 Claims, 2 Drawing Sheets

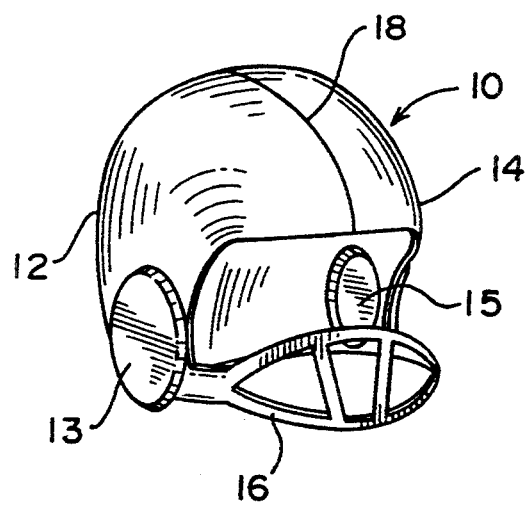
FIG_1
FIG_2
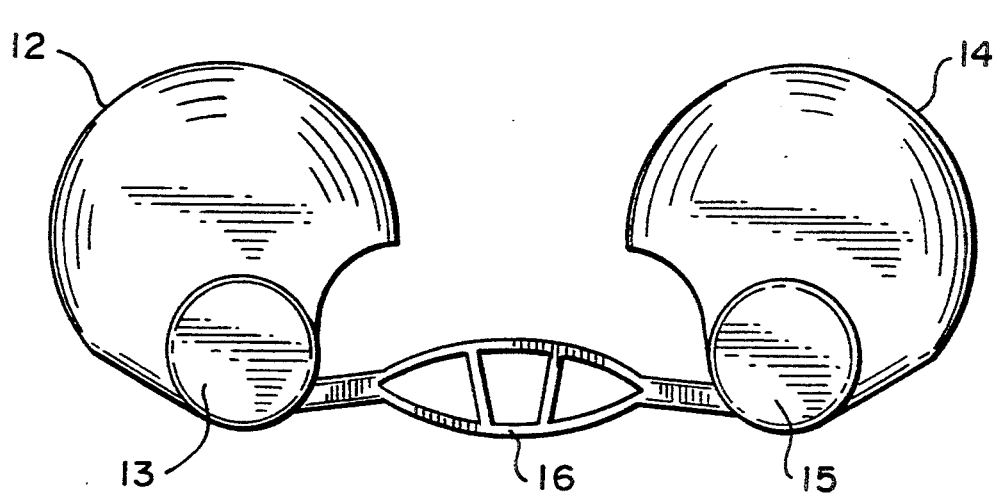
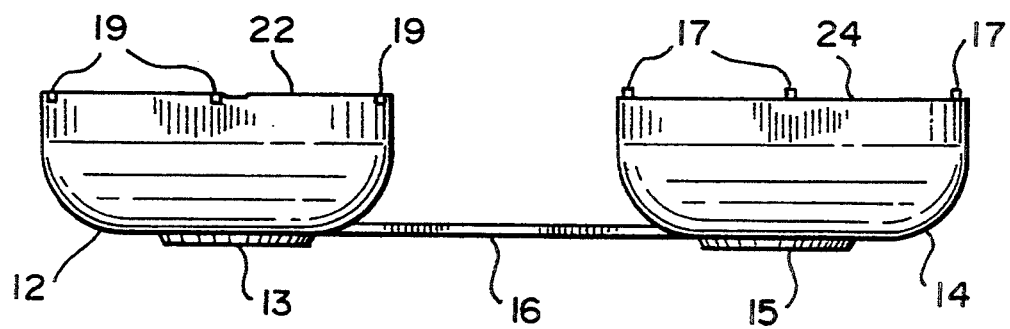
FIG_3

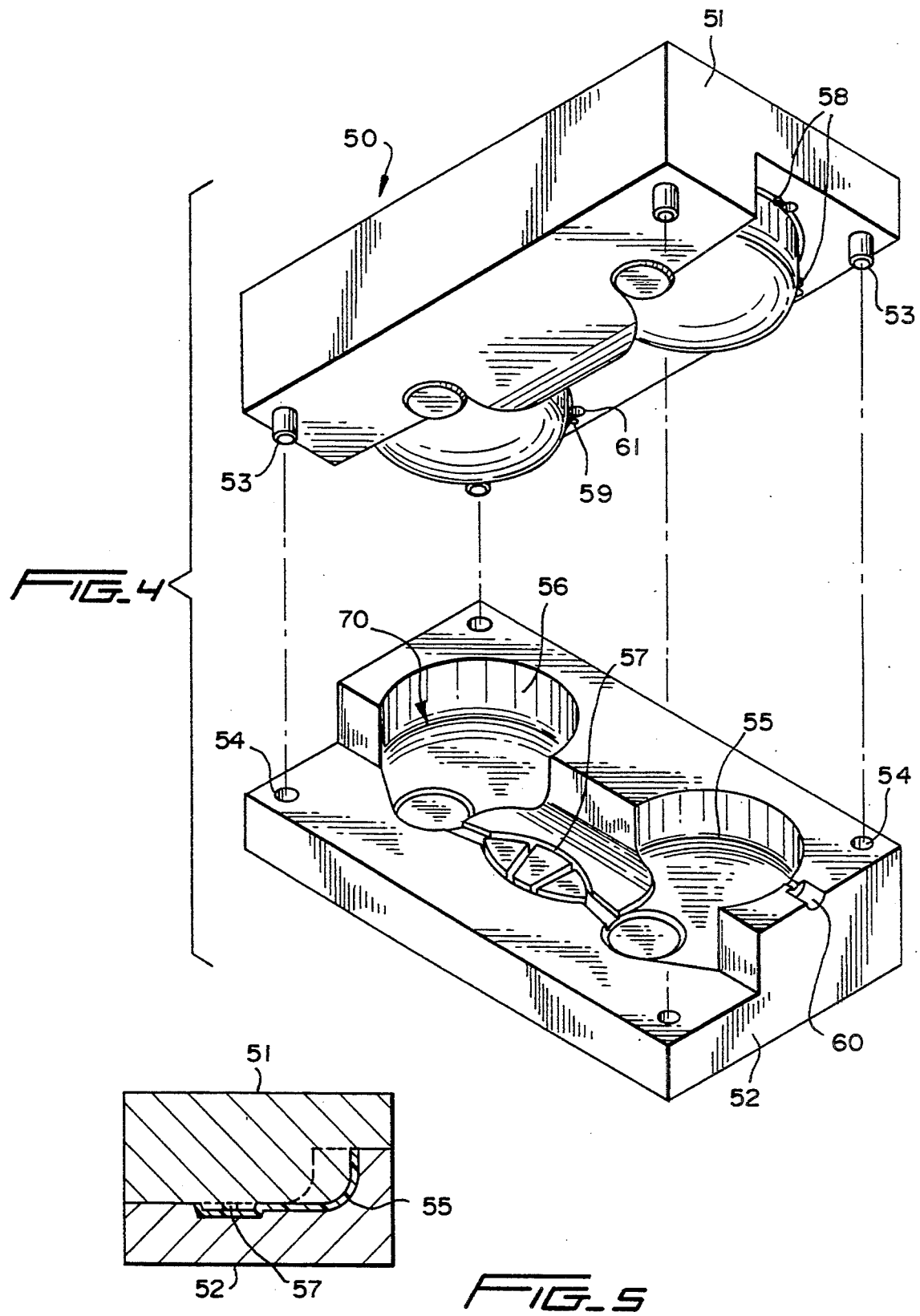

MINIATURE TOY FOOTBALL HELMET AND METHOD OF MAKING

BACKGROUND OF THE INVENTION

1. Field of the Invention

The present invention relates to miniature toy football helmets and to a method of molding and manufacturing thereof. More specifically, the present invention involves a method of integrally molding the helmet with the face guard.

2. Description of the Prior Art

The prior method used in the manufacturing of miniature toy football helmets required the helmet and face guard to be made in separate molds and then assembled together. Although the prior method is acceptable, it is more costly than the present invention for a variety of reasons, for instance, the prior method requires two individual molding processes in which two different materials are used for the helmet and for the face guard. The helmet and the face guard are then assembled together by hand to produce the final product. The prior art mold used to make the helmet portion is difficult to work with and includes details which are more costly than the present invention, such as the projections on the side of the helmet for attaching the face guard thereto.

For the above reasons, and in view of the fact that the prior art does not appear to have provided any solutions to the problem at hand, the development of the present invention occurred.

SUMMARY OF THE INVENTION

The present invention is a miniature toy football helmet and a method of manufacturing thereof. The miniature toy football helmet includes a pair of shell halves interconnected by a face guard. The face guard is integrally molded with the shell halves and bent into a curved configuration upon attachment of the shell halves together in order to form a helmet.

It is an object of the invention to provide a miniature toy football helmet which can be manufactured in a single mold, thus reducing the cost associated with manufacturing miniature toy football helmets.

It is an other object of the invention to provide a miniature toy football helmet in which the face guard is integrally formed with the helmet.

It is still further an object of the invention to provide a method of manufacturing a miniature toy football helmet which includes the use of an integrally molded face guard to thereby reduce the number of steps required during assembly.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 1 shows a perspective view of an assembled miniature toy football helmet.

FIG. 2 shows a front side view of the present invention after being removed from the mold.

FIG. 3 shows a top view of the present invention after being removed from the mold.

FIG. 4 shows the molding assembly used to manufacture the present invention.

FIG. 5 is a cross sectional view taken along line 5—5 when the molding assembly is in operation.

DESCRIPTION OF THE PREFERRED EMBODIMENTS

The detailed embodiments of the present invention are disclosed herein, however, it is to be understood that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Referring to FIGS. 1, 2 and 3, a miniature football helmet 10 is shown having a right shell 12, a left shell 14 and a face guard 16. The right shell 12 and left shell 14 include peripheral edges 22 and 24, respectively. The peripheral edges 22 and 24 are connected together along a center line 18 by any suitable connection means.

In the preferred embodiment, the connection means is shown to include pins 17, which are aligned with apertures 19 in order to cooperate with one another to secure the shells together. It is further contemplated that an adhesive could serve to secure the peripheral edges of the shells together.

An important aspect of the invention is that the shells 12 and 14 are formed integrally with the face guard 16, thus reducing the amount of manual assembly required when mass producing miniature toy football helmets. In the preferred embodiment, the face guard 16 is integrally formed with a portion of each shell 12 and 14, preferably but not necessarily extending from ear wells 13 and 15.

Turning to FIGS. 4 and 5, the mold assembly 50 used to manufacture the miniature toy football helmets 10 of the present invention is shown. The mold assembly 50 includes a male die 51 and a female die 52. The male die includes dowels 53 which mate with holes 54 in order to align the male and female dies, thereby providing a single mold cavity 70 including interconnected chambers 55, 56 and 57 in which the one piece miniature helmet is formed. Shell cavity 55 is interconnected to shell cavity 56 by a face guard cavity 57, thus when plastic material, heated to fluidity, is introduced through port 60, the plastic will flow from cavity 55 through cavity 57 and into cavity 56, forming two shell halves interconnected by a face guard. The male die 51 includes pins 58 and apertures 59 for forming pins 17 and apertures 19 on the peripheral edges 22 and 24 of the shells 12 and 14. Apertures 61, shown in the male die 51, aid in directing the fluid flow to form pins 17 and apertures 19.

In the manufacturing operation, the male die 51 and female die 52 are forced together such that dowels 53 aligned with holes 54 to form the individual chambers 55, 56 and 57 of cavity 70. Heated plastic is then injected through port 60 while the dies are maintained together. Following setting of the plastic material in the mold cavity 55–57, the dies 51 and 52 are separated from each other by any suitable means, such as hydraulic actuators. After separation, the plastic helmet is removed from the mold, the excess plastic such as the sprue formed in port 60 is removed, and the peripheral edges 22 and 24 are connected together, thus bending the face guard 16 into a curved configuration.

While various preferred embodiments have been shown and described, it will be understood that there is no intent to limit the invention by such disclosure, but rather, is intended to cover all modifications and alternate constructions falling within the spirit and scope of the invention as defined in the appended claims.

We claim:

1. A miniature toy football helmet comprising;
   a left shell;
   a right shell;
   a face guard integrally molded with and connecting said shells together; and
   wherein the right and left shells include ear wells and the faceguard extends between said ear wells.

2. The invention of claim 1 wherein said right and left shells include peripheral edges which mate with one another and said peripheral edges including pins and apertures which cooperate with one another for permanently securing the peripheral edges of said shells together.

3. The invention of claim 2 wherein said pins and apertures are integrally molded on said peripheral edges.

4. A miniature toy football helmet comprising;
   a left shell;
   a right shell; and
   a face guard integrally molded with and connecting said shells together, wherein said right and left shells include peripheral edges which mate with one another and said peripheral edges including pins and apertures which cooperate with one another for permanently securing the peripheral edges of said shells together.

5. The invention of claim 4 wherein the right and left shells include ear wells and the face guard extends between said ear wells.

6. A method of forming a miniature toy football helmet, including a pair of shells and face guard; said method including the steps of:
   molding in a single mold, the shells in a side by side relationship to each other with a face guard integrally connecting them, wherein the shells will have peripheral edges which are substantially straight;
   removing the integrally molded part from its forming mold; and
   connecting the peripheral edges of the shells together by a suitable connection means.

7. The method of claim 6 wherein the connecting step is accomplished by the connection means being in the form of pins and apertures formed in the peripheral edges of the shells which cooperate with one another in order to secure the peripheral edges together.

* * * * *